United States Patent
Smith et al.

(10) Patent No.: US 11,068,834 B2
(45) Date of Patent: Jul. 20, 2021

(54) SECURE SHIPMENT RECEIVE APPARATUS WITH DELEGATION-CHAIN

(71) Applicant: Intel Corporation, Santa Clara, CA (US)

(72) Inventors: Ned Smith, Beaverton, OR (US); Mats Agerstam, Portland, OR (US); Vijay Sarathi Kesavan, Portland, OR (US); Shilpa Sodani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 16/023,892

(22) Filed: Jun. 29, 2018

(65) Prior Publication Data
US 2019/0043010 A1    Feb. 7, 2019

(51) Int. Cl.
*G06Q 10/08* (2012.01)
*G06K 19/07* (2006.01)
(Continued)

(52) U.S. Cl.
CPC ..... *G06Q 10/0833* (2013.01); *G06K 19/0723* (2013.01); *G06Q 10/083* (2013.01);
(Continued)

(58) Field of Classification Search
CPC ............... G06Q 10/0833; G06Q 10/08; G06K 19/0723; H04L 9/0833; H04L 9/088; H04L 9/30; H04L 9/32; H04L 9/14
(Continued)

(56) References Cited

U.S. PATENT DOCUMENTS

| 10,296,865 B2 | 5/2019 | Schmidt |
| 2001/0055388 A1* | 12/2001 | Kaliski, Jr. ............. H04L 9/085 380/30 |

(Continued)

FOREIGN PATENT DOCUMENTS

| JP | 2013193856 | 9/2013 |
| JP | 2013193856 A * | 9/2013 |
| KR | 10-2015-0035833 | 3/2015 |

OTHER PUBLICATIONS

International Searching Authority, "Search Report," issued in connection with PCT patent application No. PCT/US2019/033350, dated Sep. 17, 2019, 5 pages.

(Continued)

*Primary Examiner* — Jacob C. Coppola
(74) *Attorney, Agent, or Firm* — Hanley, Flight and Zimmerman, LLC

(57) ABSTRACT

Methods, apparatus, systems and articles of manufacture are disclosed to coordinate and manage secure shipment of a package. An example shipment coordination apparatus includes an address generator and a verification engine. The example apparatus includes a shipping group coordinator to generate a group including a sender and a receiver based on a) a first digital address associated with the sender, b) a second digital address associated with the receiver, and c) at least one encryption key associated with at least one of the first digital address or the second digital address, the shipping group coordinator to initiate delivery instruction and manage receipt confirmation of a package at a second physical address corresponding to the second digital address based on verification of a token identifying the receiver and to provide messaging between the sender and the receiver in the group using a group encryption key to keep messages private in the group.

30 Claims, 9 Drawing Sheets

(51) Int. Cl.
  *H04L 9/30* (2006.01)
  *H04L 9/08* (2006.01)
  *H04L 9/32* (2006.01)
(52) U.S. Cl.
  CPC ............ *H04L 9/088* (2013.01); *H04L 9/0833* (2013.01); *H04L 9/30* (2013.01); *H04L 9/3247* (2013.01)
(58) Field of Classification Search
  USPC .......................................................... 705/50
  See application file for complete search history.

(56) References Cited

U.S. PATENT DOCUMENTS

| | | | |
|---|---|---|---|
| 2002/0138759 | A1 | 9/2002 | Dutta |
| 2007/0192191 | A1* | 8/2007 | Neal ................ G07B 17/00435 705/14.26 |
| 2008/0133659 | A1* | 6/2008 | Aldrey .................. G06Q 10/08 709/204 |
| 2012/0011068 | A1* | 1/2012 | Dearing ............... G06Q 10/083 705/50 |
| 2014/0279647 | A1 | 9/2014 | Tolcher |
| 2015/0106291 | A1* | 4/2015 | Robinson ........... G06Q 10/0838 705/339 |
| 2015/0227890 | A1* | 8/2015 | Bednarek ........... G06Q 10/0833 705/26.81 |
| 2016/0171439 | A1* | 6/2016 | Ladden ................ G06F 3/0481 705/340 |
| 2016/0235236 | A1* | 8/2016 | Byers .................... A47G 29/141 |
| 2017/0220976 | A1 | 8/2017 | Schmidt |
| 2017/0330143 | A1* | 11/2017 | Raghavan .......... G06Q 10/0833 |
| 2018/0096175 | A1* | 4/2018 | Schmeling ......... G06Q 10/0833 |
| 2018/0174122 | A1* | 6/2018 | Mattingly .......... G06Q 30/0631 |
| 2018/0349845 | A1* | 12/2018 | Klein .................. G06Q 10/0833 |
| 2019/0333000 | A1* | 10/2019 | Silver .................... G06Q 10/08 |

OTHER PUBLICATIONS

International Searching Authority, "Written Opinion," issued in connection with PCT patent application No. PCT/US2019/033350, dated Sep. 17, 2019, 8 pages.

* cited by examiner

SECURE SHIPMENT RECEIVE APPARATUS WITH DELEGATION-CHAIN

FIELD OF THE DISCLOSURE

This disclosure relates generally to secure shipment receipt coordination, and, more particularly, to a secure shipment receive apparatus and associated methods for secure shipment receipt coordination.

BACKGROUND

Traditionally, packaging and courier delivery service either drops-off a package outside a delivery address or executes multiple attempts to deliver the package when a receiver's signature is needed. If the receiver cannot be at the delivery address during delivery time and wishes to change the delivery address of time-sensitive, information-sensitive, and/or otherwise valuable shipment, then major courier services in United States provide an option to contact a sender of the package and ask the sender to assign a new delivery address.

However, with existing solutions, when the receiver is unable to be at home to receive a shipment, involving the sender to change the delivery address is not only cumbersome but also introduces logistic problems when the shipment is from an online shopping platform. Additionally, for packages that require the receiver's signature, changing the delivery address option is not offered by major courier services. As a result, the receiver must either "be at home" or pick up the package from a local distribution center. Both options may not work in some situations such as an unplanned international trip, leading to a huge inconvenience for the receiver. Further, no verification is done for the receiver. For example, prior systems accept a signature from anyone opening the door without checking a form of receiver's identification. A more assertive mechanism is needed in a public environment to deliver the package to the appropriate receiver.

DETAILED DESCRIPTION

Figure 1:
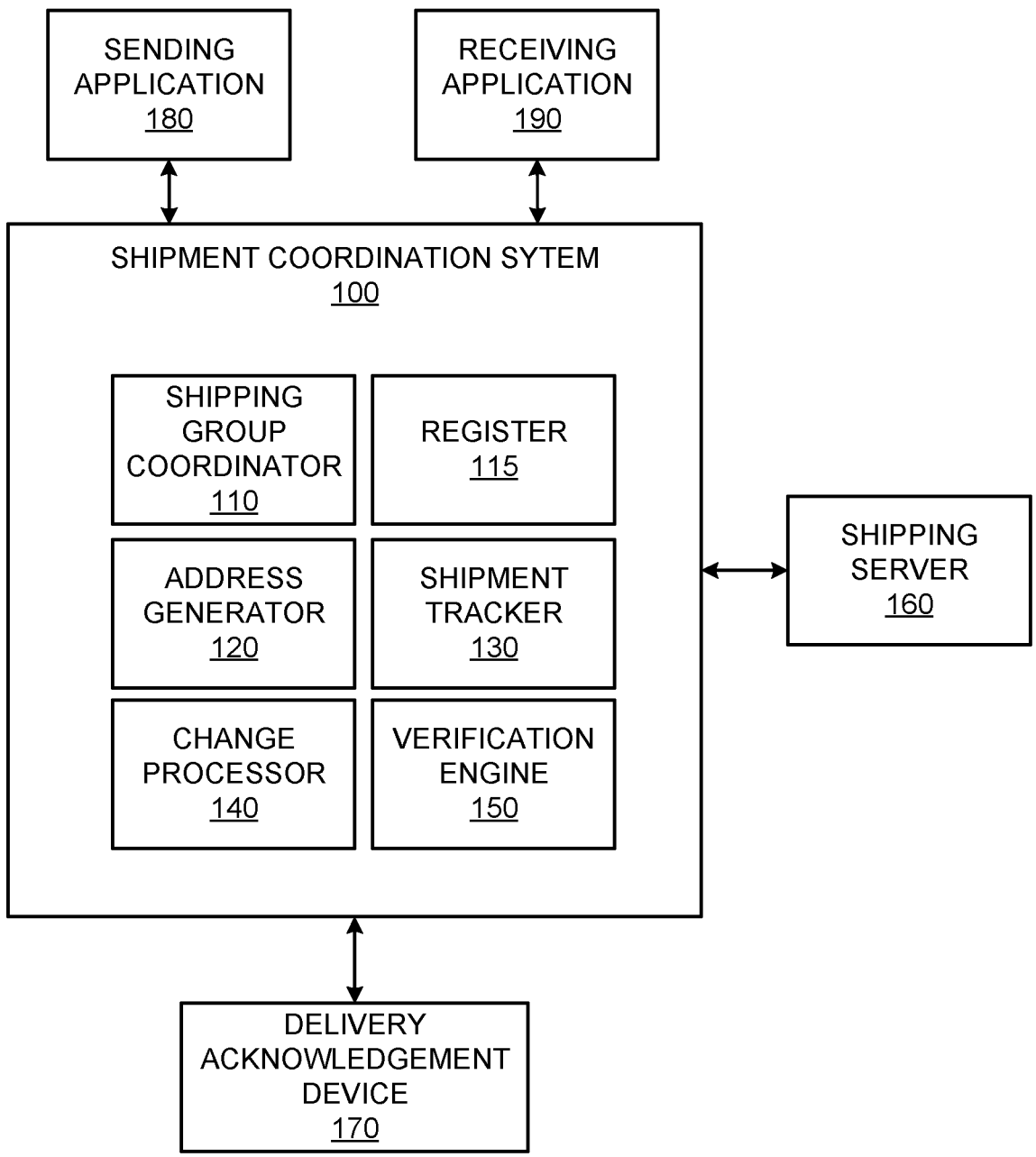
FIG. 1 shows an example of a shipment coordination system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain examples provide systems and associated methods for improved package shipment, tracking, and dynamic adjustment. Certain examples enable electronic package sign-off to provide a stronger way to approve, authorize, and/or vouch for package delivery.

In certain examples, a receiver of time-sensitive, information-sensitive, and/or otherwise valuable shipment can delegate receiving and/or signing authority to another by changing the delivery address without involving a sender of the shipment. In prior systems, any change in delivery address for a signature-required package must involve the sender and often may not be permissible after the package has been shipped. Certain examples enable dynamic adjustment of delivery address, signatory authority, and/or other delivery parameter by the recipient without requiring participation and/or authorization of the sender. The dynamic adjustment can be secured through use of a communication group with encryption, tokens, and a ledger of transactions or changes, for example.

Certain examples provide a system that does not need central trust authority to authenticate a receiver of a package. The receiver of the package can be authenticated using a digital address (DA) presented by a sender at a time of shipment initiation along with a physical address (PA). The sender of the shipments verifies both DA and PA. The DA links secure encryption keys to the verified PA, so a central trust authority is not needed to authenticate the receiver.

In certain examples, identity and evolution of the receiver can be tracked via a ledger or a chain of authorization from an original receiver to an actual receiver of a package being shipped. The chain (also referred to herein as a "delegation-chain") can be used to audit, verify, and authorize receiver(s) and track a progression of receivers if shipment breaks down, receipt is not verified, fraudulent receipt is detected, etc. Certain examples provide the delegation-chain to authenticate chain of custody in the delivery process.

In certain examples, a package can be equipped with a low power (LP) tag (e.g., a Bluetooth Low Energy (BLE) tag, radio frequency identification (RFID) tag, other radio tag, etc.), that embeds the DA for delivery and PA and/or DA verification. Such a package and associated tracking systems and methods provide improved security of prior package tracking and delivery systems and methods, for example. Such a package and associated tracking systems and methods also reduce delivery time.

In contrast, prior systems and methods require involvement of the sender to reroute a package. Additionally, the receiver is not verified when delivering a package that is to include signature confirmation. Rerouting of packages needing signature confirmation is not possible without involving the sender in prior systems and associated methods.

Further, in-home delivery presents privacy and trust issues. For example, people may not feel comfortable giving home access to a shipment company or allowing a delivery driver to enter their unattended home.

In certain examples, when the receiver is unable to personally be at home to either sign-off for the shipment delivery or to receive a time-sensitive, information-sensitive, and/or valuable shipment, alternatives are provided. For example, a recipient can electronically sign off and/or otherwise approve to leave a package outside a door. Alternatively or in addition, the recipient can designate a delegate at the same and/or different location without involvement of the sender and authorize the delegate to receive and sign for the package. Senders and receivers can send and/or receive packages from any point on the globe to any other point on the globe, for example.

Certain examples provide an apparatus and associated methods including secure shipment reception with delegation chain. In operation, the example apparatus facilitates registration of sender and receiver with a shipping company system. The sender can then initiate secure delivery of a package using the apparatus. The receiver provides proof that he/she/it is an authorized receiver to a delivery person/device and/or delegates receipt of shipment to someone/something else.

FIG. 1 illustrates an example shipment coordination system 100 including a shipping group coordinator 110, a register 115, an address generator 120, a shipment tracker 130, a change processor 140, and a verification engine 150. The example shipment coordination system 100 communicates with a shipping company server 160 and one or more delivery acknowledgement devices 170, for example. In certain examples, the shipment coordination system 100 is included in the shipping server 160.

In certain examples, a sending application 180 and a receiving application 190 each register a digital address (DA) corresponding to a physical address (PA) associated with the sender and receiver, respectively, with the register/data storage 115. For example, the sending application 180 and/or the receiving application 190 enters a PA, such as a postal address, a what3words location descriptor, a naviaddress, other locator, etc., into the address generator 120. The address generator 120 transforms the PA into a DA using, for example, an encrypted hash of the PA. The DA is associated with the PA and is stored in the register 115.

For example, suppose E represents an encryption function, SHA512 is a 64-byte hash function, SHA256 is a 32-byte hash function, Base-64 is a Base-64 encoding function, and Se is a Private encryption key. Then the DA can be calculated as follows:

---

E{PA}Se => EPA
SHA512{EPA} => H64
   (DD8C62158BB994000C74F80BDB021F245F5B25CB5EB3F
   7E7C4E0441311AEDEF127351E6411D29E39E34A9C386206
   DB61D58B525B82B21B5F149646B12870DD56)
SHA256{H64} => H32
   (68ab11f3e67b4ac1b0d1f6662089b6f208e81c30830d87ca624b
   9311a2222fc1)
DA = base64 {H32}
NjhhYjExZjNlNjdiNGFjMWIwZDFmNjY2MjA4OWI2ZjIwOGU4M
WMzMDgzMGQ4N2NhNjI0Yjkz MTFhMjIyMmZjMQ==

---

In the example above, a private encryption key is used to generate the DA as well as to verify the encryption keys, which eliminates a need for a central trusted authority to generate and verify a DA from a PA. The PA is encrypted and then hashed to generate a 64-bit hash. The 64-bit hash is hashed to generate a 32-bit hash, which is then converted to base-64 to provide the DA.

In certain examples, to address multiple authorized receivers at the same PA (e.g., a corporate office, dormitory, etc.), the address generator 120 can generate the same DA for a given PA on different devices associated with different users using deterministic public/private key generation from a passphrase. Each user that is registered has its own signing keys to distinguish between different receivers at the same PA, for example.

When a sender initiates a secure delivery, the shipment coordination system 100 initiates delivery instructions and/or parameters for delivery of a package to an intended receiver. For example, the sending application 180 receives input parameters for the package and presents a PA and DA associated with the sender along with a PA and DA associated with the receiver to the register 115. The register 115 can include and/or be associated with an application on the shipping server 160, for example. The sending application 180, alone or in conjunction with the receiving application 190, triggers creation of a secure group and a proof-of-authorized-receiver token. The token can be used to identify the correct receiver of a shipment, for example.

Once the sender and receiver PA/DA have been input into the system 100, the verification engine 150 verifies whether the sender and receiver PA and DA are stored in the register 115. If one or both the sender and receiver do not have a PA/DA pair in the register 115, then the register 115 and address generator 120 work to add the missing information to the register 115. If both the sender and receiver are in the register 115, then the shipping group coordinator 110 creates a secure group for the shipment. The secure group has a group encryption key (Ge) and a proof-of-authorized-receiver token (T). For example, the token is a light-weight JavaScript Object Notation (JSON) Web token identifying the receiver of the shipment. For example, a JSON Web token can be represented as follows:

---

{
   "recv": "1234567", //receiver Id
   "name": "John Doe",
   "exp": 1426420800
}

---

The shipping group coordinator 110 can register sender and receiver and initiate delivery instructions and/or delivery parameters for a package. For example, the shipping group coordinator 110 sends a digitally signed invitation to both sender (e.g., sending application 180) and receiver (e.g., receiving application 190) to join the group (G), for example. The sending application 180 and receiving application 190 verify a digital signature of the invitation to join the group (G), for example.

The shipping group coordinator 110 then requests public keys from the sending application 180 and the receiving application 190. The sending application 180 and the receiving application 190 share message(s) including their DA, encrypted PA (E{PA}se), public encryption key (Pe), and public signing key (Ps) along with a nonce word representing a freshness of the message and the digital signature, for example. The verification engine 150 works with the shipping group coordinator 110 to verify the keys corresponding to each DA and save the keys in the register 115, for example. The shipping group coordinator 110 digitally signs and encrypts the token (T) and the group encryption key (Ge) and sends the token and key to the sending application 180 and the receiving application 190. Messages exchanged in the group (G) are encrypted using the group encryption key (Ge), for example.

A receiver then provides (e.g., via the receiving application 190 on a delivery acknowledgement device 170 such as a tablet computer, smartphone, etc.) proof-of-authorized-receiver to a delivery person, device, etc., and/or delegates shipment receipt to someone else. For example, the receiver is present at home and/or other target delivery location and electronically presents the token (T) to the delivery person/device as a "Proof-of-Authorized-Receiver". The delivery person/device verifies the token (e.g., using the verification engine 150 and/or register 115, etc.), accepts the digital signature of the receiver, and delivers an associated package to the receiver. Thus, the delivery acknowledgement device 170 and/or the receiving application 190 provide receipt confirmation associated with delivery of the package to an authorized receiver at the target address based on verification of the token and the digital signature of the receiver, for example.

In another example, the receiver is not present at the target delivery location (e.g., home, work, school, etc.) and shares the token with the delivery person/device remotely via a cloud service. The receiver then authorizes the delivery person/device to leave the package outside the target delivery location by digitally signing for the package.

In another example, the receiver is not present at the target PA delivery location (e.g., home, work, school, etc.) to receive delivery and delegates someone else to receive the package by changing the delivery address of the shipment. For example, the receiver informs the group that it wishes to delegate receiving of the shipment to someone else by providing the delegate PA and DA to the change processor 140 as a new shipment address. The verification engine 150, alone or in conjunction with the shipping server 160, verifies the delegate PA and DA and updates the JSON Web Token with the new receiver information. The shipping group coordinator 110 invites the receiving application 190 associated with the new receiver to join the group. The new receiving application 190 joins the group and share its keys with the shipping group coordinator 110. The shipping group coordinator 110, alone or in conjunction with the verification engine 150, verifies the keys shared by the new receiving application 190 for a corresponding DA and saves them in its database. The shipping group coordinator 110 then shares the new token with the group and group key with the new receiving application 190. The updated receiving application 190 facilitates acknowledgement/confirmation of receipt of the shipment as the original receiver would have as outlined above.

Thus, an original intended receiver can delegate or specify an alternate receiver. Rather than withholding delivery of the package, the shipping server 160 works with the shipment coordination system 100 to facilitate update and delivery to an authorized actual receiver who is different than the original, intended receiver, for example.

In certain examples, a tracking and/or identification device, such as a BLE tag, RFID tag, other LP tag, etc., can be placed on and/or embedded in a package to be shipped. The tag can be used for sensing, computing, and/or communication with respect to the package, for example. The tag can be used to track shipment (e.g., track a high-value shipment, etc.), monitor an environmental condition (e.g., temperature and/or humidity of perishables, medicine, etc.), sense vibration, determine orientation, etc. In certain examples, tags can be used to enable chain-of-custody to show a chronological audit trail of custody, control, and transfer of a package, etc.

The tag can be provisioned with the DA of sender and receiver, for example, which enables the shipment tracker 130 to verify that the receiver is getting the intended package (e.g., by comparing the receiver DA information of a recipient and the tag, etc.). If the receiver is changed during shipment, the receiver DA on the tag can be updated (e.g., by the change processor 140 in communication with the shipment tracker 130, shipping server 160, a gateway, etc.). For example, when a package traverses multiple intermediate shipping companies, the intermediate DAs are included in the tag, and each time a shipper transfers custody to another shipper, the DA on the tag is compared to the receiver DA for verification and tracking.

In certain examples, the sender and/or receiver can dynamically change their PA (e.g., referred to as a "follow-me" use case). For example, a receiver may wish to have a package delivered while she is at work or at a flea market. The sender can re-route deliveries efficiently using drivers, robots, drones, and/or other autonomous delivery vehicle. The receiving application 190 can broadcast a dynamic PA by computer $E\{PA'\}Se$, where PA' is a revised delivery target, for example. In certain examples, given that the token (T) exists, the Web token (T) can be used to efficiently broadcast the revised PA' by computing $E\{PA'\}Ge$ or $E\{PA', Nonce\}GE$, etc., if a replay attack is a concern.

A most current location can then be saved in the register 115, shipping server 160 database, etc., as the receiver DA, for example. The most current location is used to inform delivery vehicle(s) regarding intended receiver location. In certain examples, where the PA is other than a postal address, such as What-Three-Words address, etc., the package can be delivered to any geographical location with one-meter accuracy, even if there are no defined postal addresses. Thus, the receiver can receive timely deliveries regardless of location, choice of activity, etc.

In certain examples, a blockchain can be used to create an immutable log of dynamic "follow-me" addresses. Blockchain technology is a distributed computing mechanism designed to provide a degree of fairness such that one entity is not advantaged while another entity is disadvantaged. A blockchain is a distributed, public ledger of transactions (e.g., financial transactions, data transactions, etc.) in which the transactions are recorded publicly and chronologically and can be verified by participants without a central authority. Blockchain applies cryptographic algorithms to a shared or distributed database to allow any user to read the database, add to the database, and to help ensure no single user can control what is written to the distributed database. Any blockchain user can view all transactions with respect to the distributed database. Blockchain technology provides disintermediation to reduce intermediaries in communication between data producers and data consumers, for example. That is, rather than engaging a middleman to facilitate a transaction, two entities (e.g., a data consumer and a data supplier) can connect and engage in a transaction directly. Other entities can see the transaction, so the blockchain serves as a distributed consensus engine for the entities to verify and/or otherwise agree to the existence of the transaction.

In blockchain-based technology, a log of transactions is processed by a distributed system of message brokers. The message brokers are a set of distributed entities that agree on a present state of transaction processing and a historical state of transaction processing. A transaction processing log is protected with a cryptographic hash, for example, and each broker has a copy of the transaction processing log. The blockchain of distributed entities also provides an algorithm to synchronize processing of each transaction. Synchronized processing helps to ensure fairness among brokers.

For example, when an entity seeks to add information to the blockchain, participating entities, which all have copies of the existing blockchain, run algorithms to evaluate and verify the proposed addition (e.g., the proposed transaction). If a majority of participating entities agree that the addition is valid (e.g., matches the blockchain's history, etc.), then the addition becomes a new block in the blockchain, viewable by the participating entities. A copy of the updated blockchain is conveyed to each participating entity so each entity can see the transaction and has an up-to-date copy of the blockchain log of transactions.

The shipping server 160 and/or shipping coordination system 100 commits DAs to the blockchain and/or other digital ledger, for example, to protect sender and receiver privacy, but any participant can, in an appropriate legal context, disclose the Ge or Se values to reveal actual physical addresses, for example. Blockchain DA values can be used to establish a sequence of "follow-me" addresses (e.g., a chain of authorization) for delivery sign-off requirements, checkpoint requirements, etc.

While an example implementation of the shipment coordination system 100 is illustrated in FIG. 1, one or more of the elements, processes and/or devices illustrated in FIG. 1 can be combined, divided, re-arranged, omitted, eliminated and/or implemented in any other way. Further, the example shipping group coordinator 110, the example register 115, the example address generator 120, the example shipment tracker 130, the example change processor 140, the example verification engine 150, and/or, more generally, the example shipment coordination system 100 of FIG. 1 can be implemented by hardware, software, firmware and/or any combination of hardware, software and/or firmware. Thus, for example, any of the example shipping group coordinator 110, the example register 115, the example address generator 120, the example shipment tracker 130, the example change processor 140, the example verification engine 150, and/or, more generally, the example shipment coordination system 100 of FIG. 1 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example shipping group coordinator 110, the example register 115, the example address generator 120, the example shipment tracker 130, the example change processor 140, the example verification engine 150, and/or, more generally, the example shipment coordination system 100 of FIG. 1 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example shipment coordination system 100 of FIG. 1 can include one or more elements, processes and/or devices in addition to, or instead of, those illustrated in FIG. 1, and/or may include more than one of any or all of the illustrated elements, processes and devices.

Flowcharts representative of example machine readable instructions for implementing the example shipment coordination system 100 of FIG. 1 are shown in FIGS. 2-6. In these examples, the machine-readable instructions include a program for execution by a processor such as a processor 712 shown in the example processor platform 700 discussed below in connection with FIG. 7. The program can be embodied in software stored on a non-transitory computer readable storage medium such as a CD-ROM, a floppy disk, a hard drive, a DVD, a Blu-ray disk, or a memory associated with the processor 712, but the entire program and/or parts thereof can alternatively be executed by a device other than the processor 712 and/or embodied in firmware or dedicated hardware. Further, although the example program is described with reference to the flowcharts illustrated in FIGS. 2-6, many other methods of implementing the example shipment coordination system 100 of FIG. 1 can alternatively be used. For example, the order of execution of the blocks may be changed, and/or some of the blocks described can be changed, eliminated, or combined. Additionally or alternatively, any or all of the blocks can be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 2-6 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc., can be present without falling outside the scope of the corresponding claim. As used herein, when the phrase "at least" is used as the transition term in a preamble of a claim, it is open ended in the same manner as the term "comprising" and "including" are open ended.

Example machine readable instructions for implementing the shipment coordination system 100 of FIG. 1 and that can be executed to manage package shipment and delivery are illustrated in FIGS. 2-6. With reference to the preceding figures and associated descriptions, the example machine readable instructions 200 to manage package shipment and delivery begin at block 202.

At block 202, a sender and receiver register for shipment with the shipment coordination system 100. For example, the shipping group coordinator 110 and the register 115 work with the address generator 120 to generate a DA for each PA provided to the system 100 (e.g., a shipping PA and a receiving PA, etc.). For example, encrypted, hashed DA values can be formed by the address generator 120 from address information such as a postal address, a What-Three-Words address, a naviaddress, and/or other geographic locator and stored with the register 115. In certain examples, a PA having multiple potential receivers can employ a DA with a different signing key associated with each receiver at that DA.

At block 204, a secure delivery of a shipment is initiated. For example, a sender uses the sending application 180 to initiate secure shipment of a package. For example, the sending application 180 provides PA and DA of the sender and receiver to the shipment coordination system 100 to trigger verification by the verification engine 150 and generation of a secure shipping group by the shipping group coordinator 110. The sending application 180 and receiving application 190 then have a group encryption key (Ge) to use when communicating regarding the shipment, for example. The shipping group coordinator 110 initiates generation of delivery instructions/parameters for delivery of the shipment to the PA of the receiver.

At block 206, receipt of the shipment is managed. For example, the receiving application 190 can leverage a delivery acknowledgement device 170, in person and/or remotely via a network such as "the cloud", to verify a token (T) as a proof of authorized receiver. Alternatively, the change processor 140 can work with the receiving application 190 and/or the delivery acknowledgement device 170 to invite a new receiver to the group (e.g., via the shipping group coordinator 110) and confirm delivery and receipt of the shipment to the new receiver at a new delivery address (e.g., using the address generator 120 and shipment tracker 130) by verifying the token (T), for example.

Thus, physical addresses, digital addresses, sender, and recipient(s) can be associated using public/private key association with a group for communication and token verification. All members of the group have access to the token and communication within the group occurs in association with the token. Any member of the group can change an address, delegate a new receiver, etc., using the token. The token may be modified, re-generated, etc., when a receiver is added and/or subtracted from the group, for example.

In certain examples, sender and receiver can be identified using a self-sovereign identity rather than relying on a shipping company and/or other external source for identification. For example, a sender and/or receiver can self-assert an identity and use a blockchain to establish properties of their identity to assert uniqueness of that identity. Key(s) can be associated with the self-sovereign identity as well to allow members of the shipping communication group to verify and communicate with each other, for example.

In certain examples, exchange of data flows can be viewed as transactions and can be placed in a ledger to track and be used in an audit. For example, a ledger and blockchain can be used to track who did what when, what keys were used, etc., to monitor (e.g., using the shipment tracker 130) the status and progress of a shipment, etc.

In certain examples, a shipping company hosts the shipping server 160 and an associated service providing the shipment coordination system 100. Interaction between a sender and receiver(s) goes through the shipping server 160, and each sender and receiver has an application/user interface such as the sending application 180, receiving application 190, etc. Proof of authorized receiver is provided to a delivery person/device to complete the shipment cycle for the shipping communication group.

Figure 2:
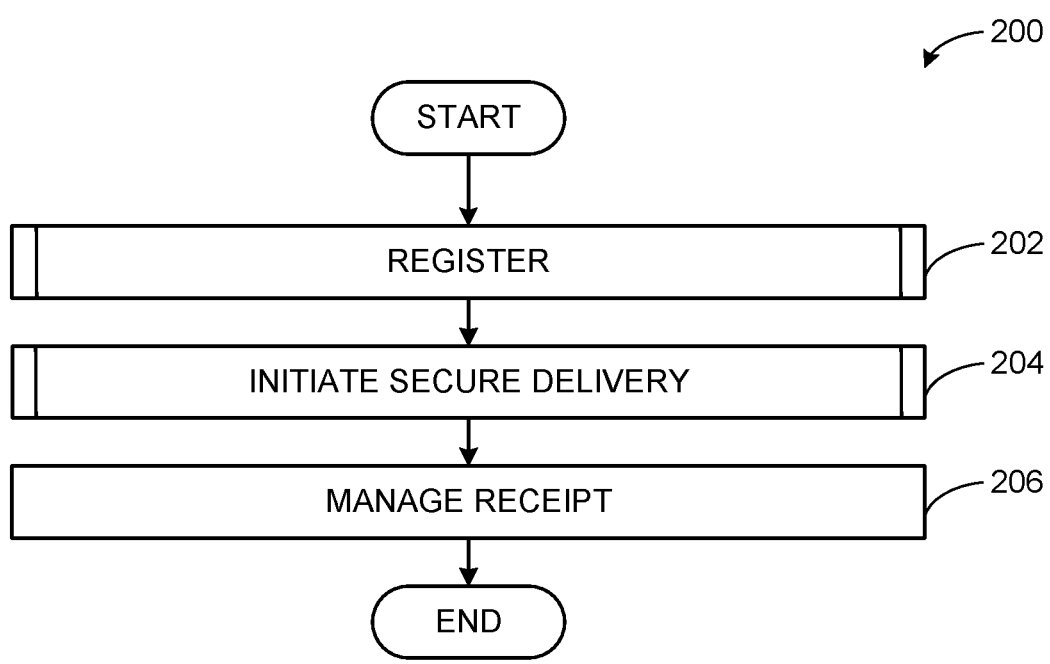
FIGS. 2-6 illustrate flow diagrams representative of example machine readable instructions that can be executed to implement the example system of FIG. 1.
Figure 3:
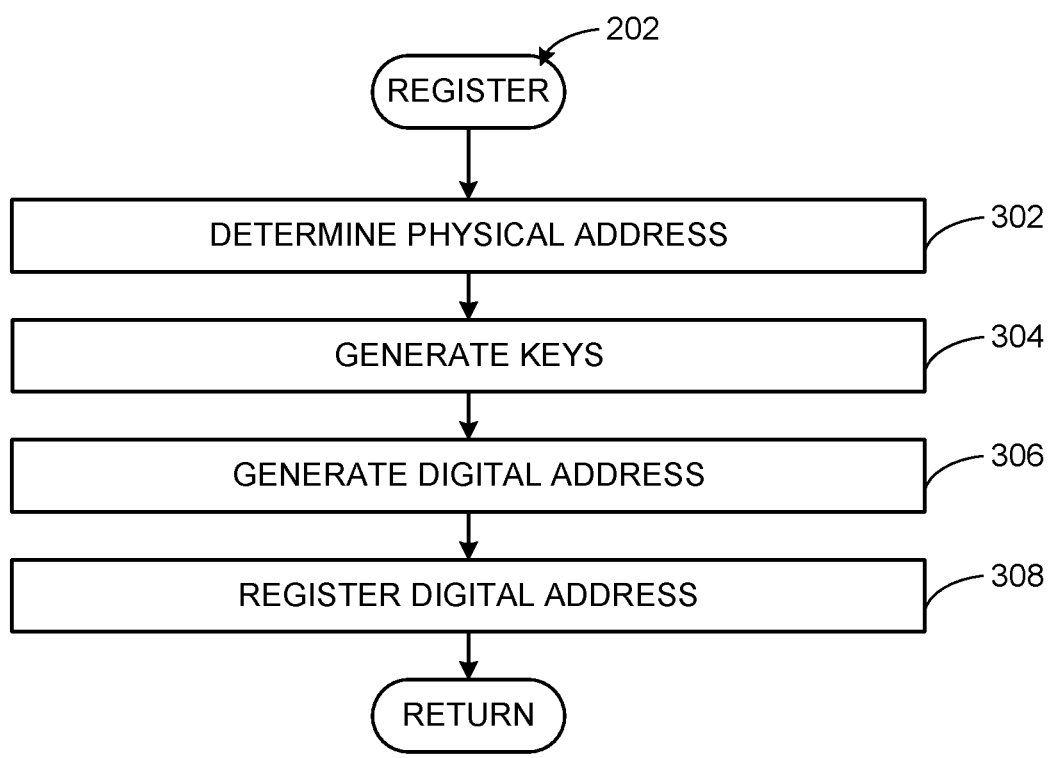

FIG. 3 illustrates a flow diagram representing example machine readable instructions to facilitate registration for shipment (e.g., block 202 of the example method of FIG. 2). At block 302, a PA is determined for the sender or receiver.

For example, a postal address, what-three-words address, naviaddress, and/or other geolocation is provided to the address generator 120.

At block 304, keys are generated from the PA. For example, the address generator 120 generates public/private encryption keys and signing keys (Pe, Ps, Se, Ss) associated with the PA.

At block 306, a DA is generated for the PA. For example, the address generator 120 employs an encryption function (E), which uses a hash function (e.g., SHA512, SHA256, etc.) and an encoding function (e.g., Base-64, etc.) to generate a DA corresponding to the input PA.

At block 308, the DA is registered with the register 115 so that the shipping group coordinator 110 can associate the DA with a shipment, for example. In certain examples, the private encryption key used to generate the DA can be used to verify the encryption keys, and an entity associated with the DA receives a signing key for its communication. If multiple receivers are at a same DA, each receiver can be associated with its own signing key to differentiate among the receivers at the DA, for example.

Figure 4:
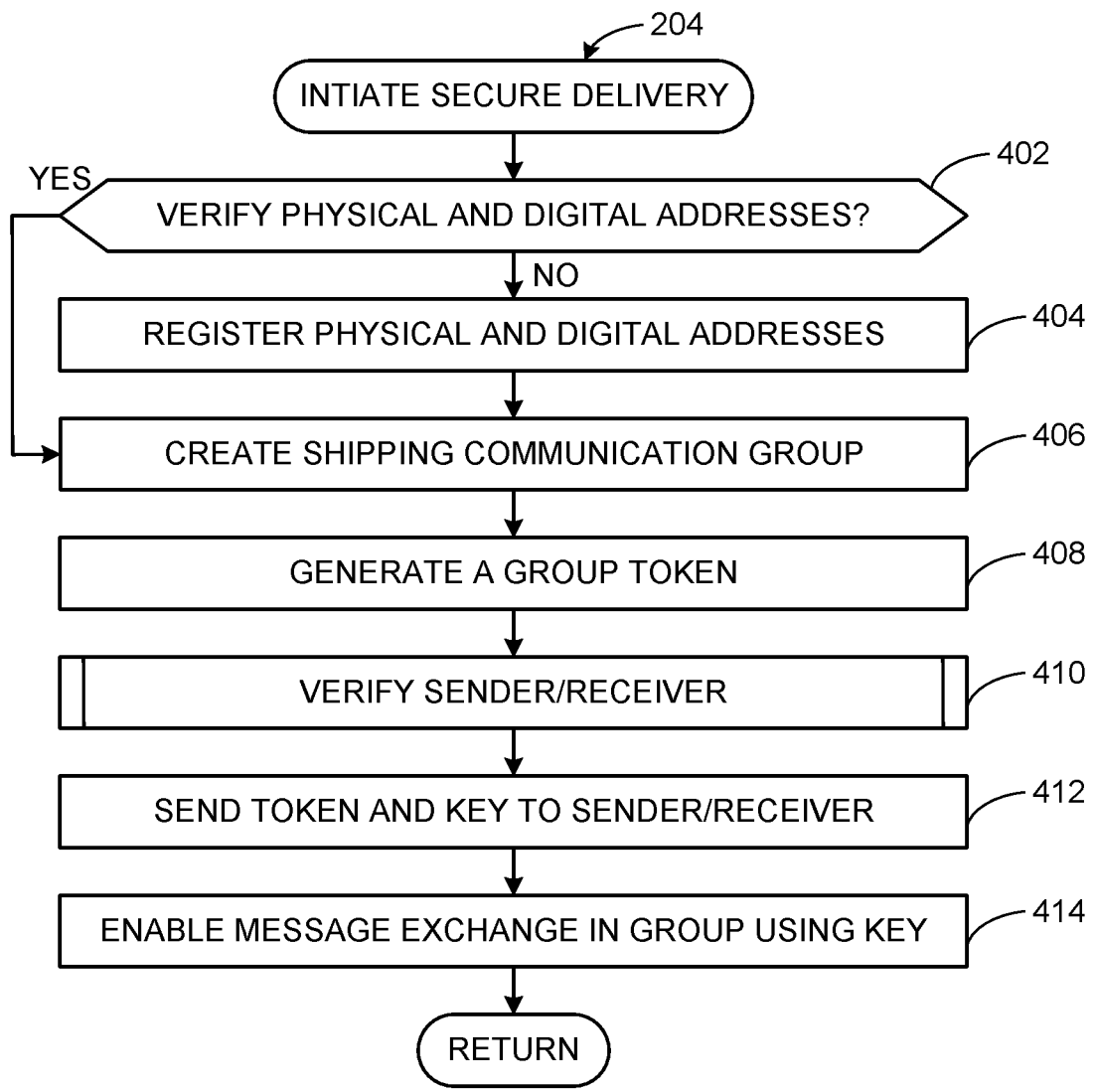

FIG. 4 illustrates a flow diagram representing example machine readable instructions to facilitate registration for shipment (e.g., block 204 of the example method of FIG. 2). At block 402, the PA and DA associated with the sender and receiver are verified. For example, the shipping group coordinator 110 verifies that both the sender and receiver have a PA and DA saved in the register 115. If the sender or receiver does not have a PA/DA pair in the register 115, then, at block 404, the PA and DA are registered with the shipment coordination system 100 and stored in the register 115. For example, the DA is generated from the PA and stored in the register 115 as disclosed above with respect to FIGS. 1-3.

At block 406, a shipping communication group is created for the sender and receiver by the shipping group coordinator 110. The group (S1) is created for the particular shipment, for example. The shipping group coordinator 110 creates a group encryption key (Ge) for group communication. The group encryption key can be used by sending application 180, receiving application 190, and shipping server 160 to communicate regarding PA, DA, changes in PA/DA, change in authorized receiver, shipment/delivery status, other delivery instructions/parameters, receipt confirmation, etc. At block 408, the shipping group coordinator 110 generates a token (T) for the group (S1) which serves as proof of authorized receiver for the shipment. Thus, the shipping group coordinator 110 facilitates messaging between the sender and the receiver in the group by providing a channel for message communicates within the group as well as the encryption key to help ensure only authorized group members can read and process the messages. Non-group members without the key Ge are unable to read and act on the messages and message content.

At block 410, the shipping group coordinator 110 verifies the sender and receiver to join the group (S1). For example, the shipping group coordinator 110 verifies a DA, encrypted PA, public encryption key, public signing key, nonce word, and digital signature from each sender and/or receiver for the group (S1) and saves the information to the register 115. For example, for a message (M) to be signed, the message (M) can be encoded as $H32=SHA256(M)$ using hash function SHA256. The digital signature can then be generated by Digital Signature=$E\{H32\}Ss$, which provides an encrypted one-way hash using a signing key (Ss), for example.

At block 412, the token (T) and group encryption key (Ge) are sent by the shipping group coordinator 110 to the sender and receiver to enable communication and authorization in relation to the shipment. For example, the shipping group coordinator 110 sends the group encryption key (Ge) encrypted by the public encryption key (Pe) in conjunction with the token (T) encrypted by the group encryption key (Ge), a nonce word to verify freshness of the message, and a digital signature to the sender and receiver. The sending application 180 and receiving application 190 verify the digital signature from the shipment coordination system 100 and decrypt and save the group encryption key (Ge) and the token (T). The applications 180, 190 can use the group encryption key (Ge) in message exchange in the group via the shipping group coordinator 110 and can use the token (T) to provide proof of authorized recipient to the receiving application 190 and/or delivery acknowledgement device 170 for confirmation of package delivery/receipt by an authorized receiver, for example.

Figure 5:
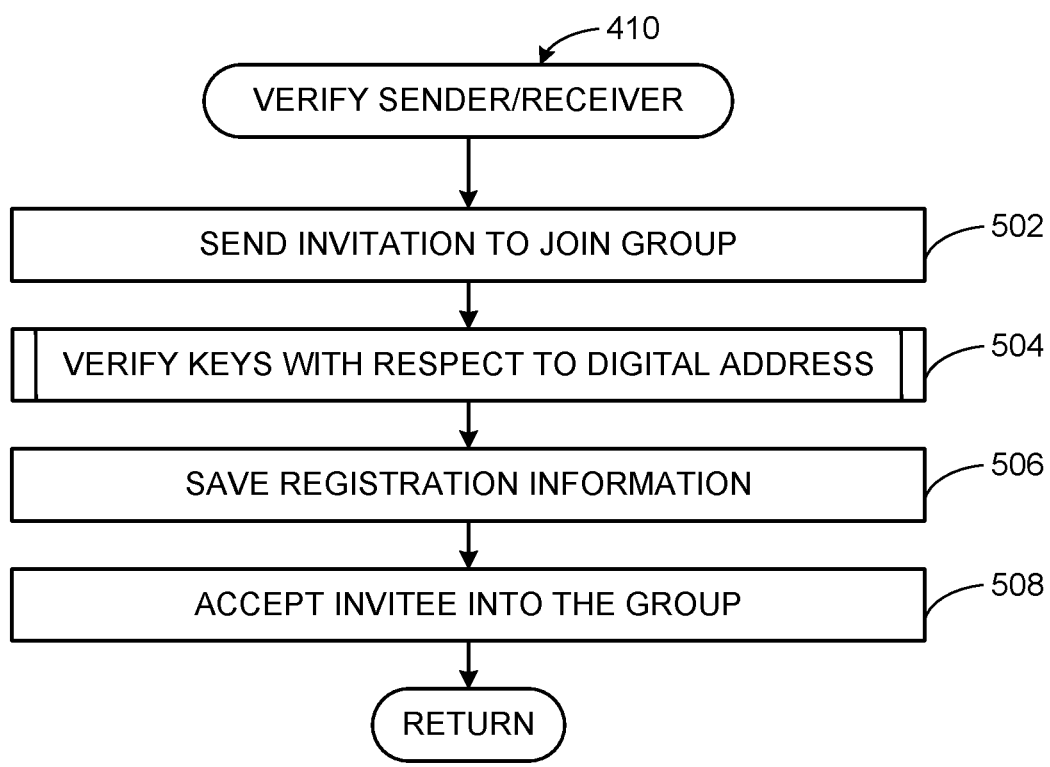

FIG. 5 illustrates a flow diagram representing example machine readable instructions to verify a sender and/or receiver for a shipping communication group (e.g., block 410 of the example method of FIG. 4). At block 502, the shipping group coordinator 110 sends an invitation to the sender and/or receiver to join the group (S1). For example, the shipping group coordinator 110 transmits an invitation message to the sending application 180 and/or the receiving application 190. The example process occurs equivalently for the sender and the receiver to verify and join the group (S1).

At block 504, the shipping group coordinator 110 verifies key information from the invitee (e.g., the sender or receiver). For example, in response to the invitation from the shipping group coordinator 110, the sender/receiver acknowledges the invitation upon verifying the coordinator's digital signature and responds by sending its public encryption key and public signing key with DA to the shipping group coordinator 110 for verification. For example, the invitee can transmit a message including the DA with encrypted PA (E{PA}Se), public encryption key (Pe), public signing key (Ps), nonce word, and digital signature to the shipping group coordinator 110 for group (S1).

At block 506, registration information is saved for the invitee. For example, the shipping group coordinator 110 verifies that the public encryption key (Pe) and public signing key (Ps) correspond to the DA and saves the keys (Pe, Ps) in the register 115, for example.

At block 508, the invitee is accepted into the group by the shipping group coordinator 110. For example, the shipping group coordinator 110 adds the sender and/or receiver to the group (S1) and sends a message (e.g., returning to block 412) including the group encryption key (Ge) encrypted using the public encryption key (Pe) (e.g., E{Ge}Pe) with the token (T) encrypted using the group encryption key (Ge) (e.g., E{T}Ge), a nonce word, and a digital signature. The sending application 180 and/or the receiving application 190 verifies the digital signature and decrypts and saves the token (T), for example.

Figure 6:
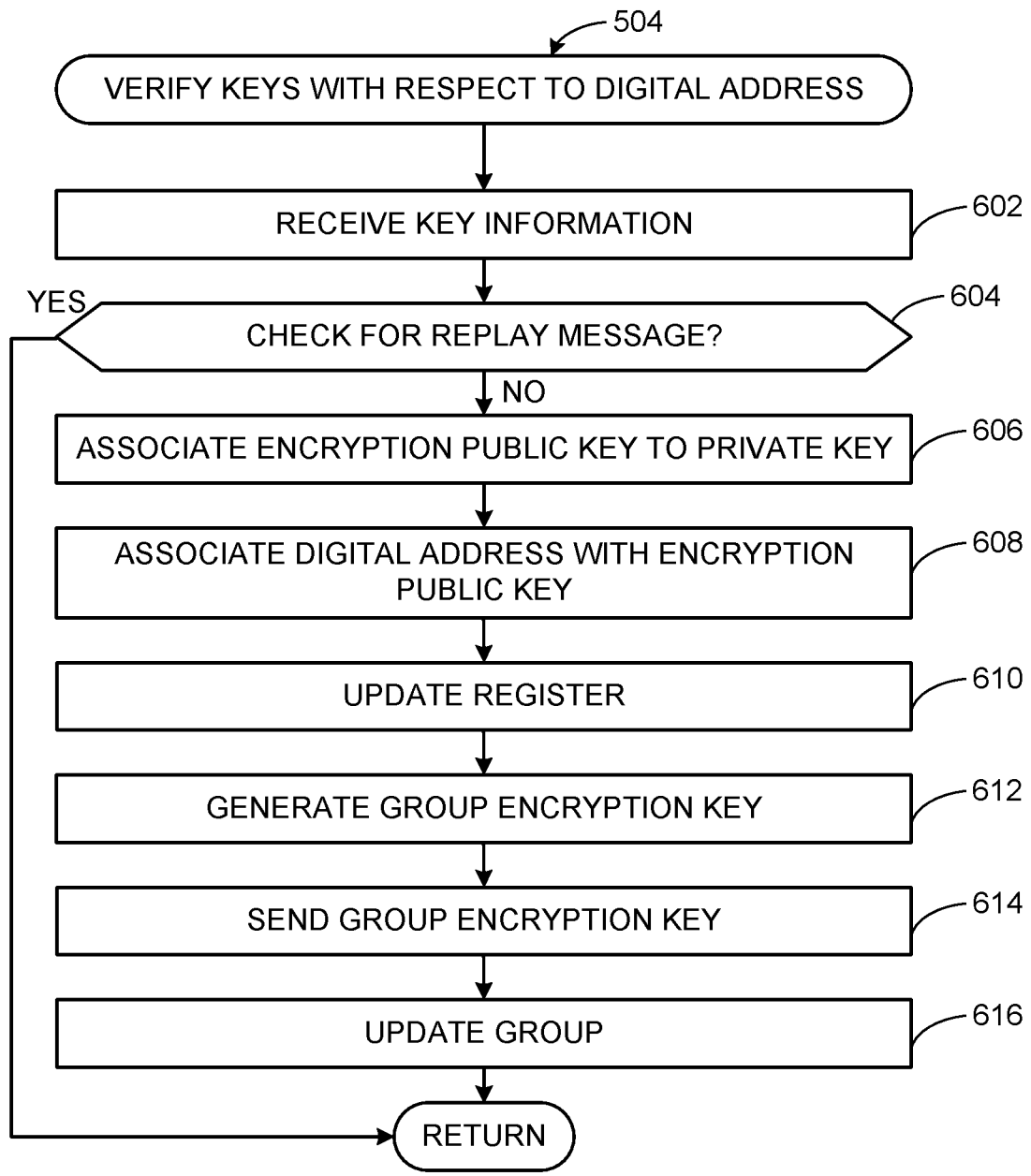

FIG. 6 illustrates a flow diagram representing example machine readable instructions to verify keys with respect to the digital address (e.g., block 504 of the example method of FIG. 5). At block 602, key information is received. For example, the shipping group coordinator 110 receives a message including the DA, Encrypted PA (E{PA}se), Public Encryption Key (Pe), and Public Signing Key (Ps) along with a Nonce to verify the freshness of the message and a digital signature to verify the source of the message.

At block 604, the nonce word is examined to verify that the message is not a replay or tempered message. If the message is a replay (e.g., is repeated or has already been processed), then the process ends as the message has already been handled. Otherwise, control proceeds to block 606 to associate the public encryption key with a private key (e.g., by decrypting (D) of D{E{PA}Se}Pe=>PA). At block 608, the DA corresponding to the PA is associated with the public encryption key. For example, the PA can be processed to identify and associate the DA with the public encryption key as follows:

```
SHA512{E{PA}Se} = Hash64
SHA256{Hash64} = Hash32
Base64{Hash32} => DA
```

Thus, a 64-byte hash function is applied to the encrypted PA with the private encryption key, and the result is provided to a 32-byte hash function, which is then encoded with a base-64 encoding function to produce the DA, for example. In certain examples, if a first receiver delegates receiving authority to a second receiver, an updated DA can be generated to include the second receiver in the group with authorization and delivery information. At block 610, the register 115 is updated with the PA, DA, public encryption key (Pe), public signing key (Ps), etc. In certain examples, a chain of receivers can be maintained in the register 115.

At block 612, the group encryption key (Ge) is generated. For example, the shipping group coordinator 110 generates the group encryption key (Ge) based on the sender and receiver information for the group. At block 614, the group encryption key (Ge) is sent to the members of the group (e.g., the sending application 180, the receiving application 190, the shipping server 160, etc.). For example, the shipping group coordinator 110 sends the group encryption key (Ge) encoded by the public encryption key (Pe) (e.g., E{Ge}Pe) and the token (T) encrypted by the group encryption key (Ge) (e.g., E{T}Ge), along with a nonce word and digital signature to members of the group.

At block 616, the group is updated with the current DA and public signing key (Ps). For example, the shipping group coordinator 110 updates the group (S1) by broadcasting to group members (e.g., the sending application 180, the receiving application 190, the shipping server 160, etc.) the DA, Ps, nonce word, and digital signature.

Thus, certain examples provide a shipment coordination system with a shipping group coordinator to enable/provide/facilitate initiation of delivery instructions and/or other setting of delivery parameters (e.g., target PA and associated DA, identity of authorized receiver, token information, group messaging key information, etc.) to trigger delivery of a shipment to an authorized receiver. The shipping group coordinator establishes a group including sender and receiver and helps ensure that the sender and receiver can message each other via the shipping group coordinator using a group encryption key to help ensure privacy and targeted delivery to its intended recipient(s) (e.g., shipping application 180, receiving application 190, shipping server 160, delivery acknowledgment device 170, etc.). The shipping group coordinator can facilitate messaging by providing the group encryption key as well as a channel/conduit/medium/etc. for exchange of messages among the group members, for example. The group encryption key can be used to verify that a message received by an application or device is intended for that application/device and can be read and/or otherwise processed by the application/device as a member of the group, for example.

Figure 7:
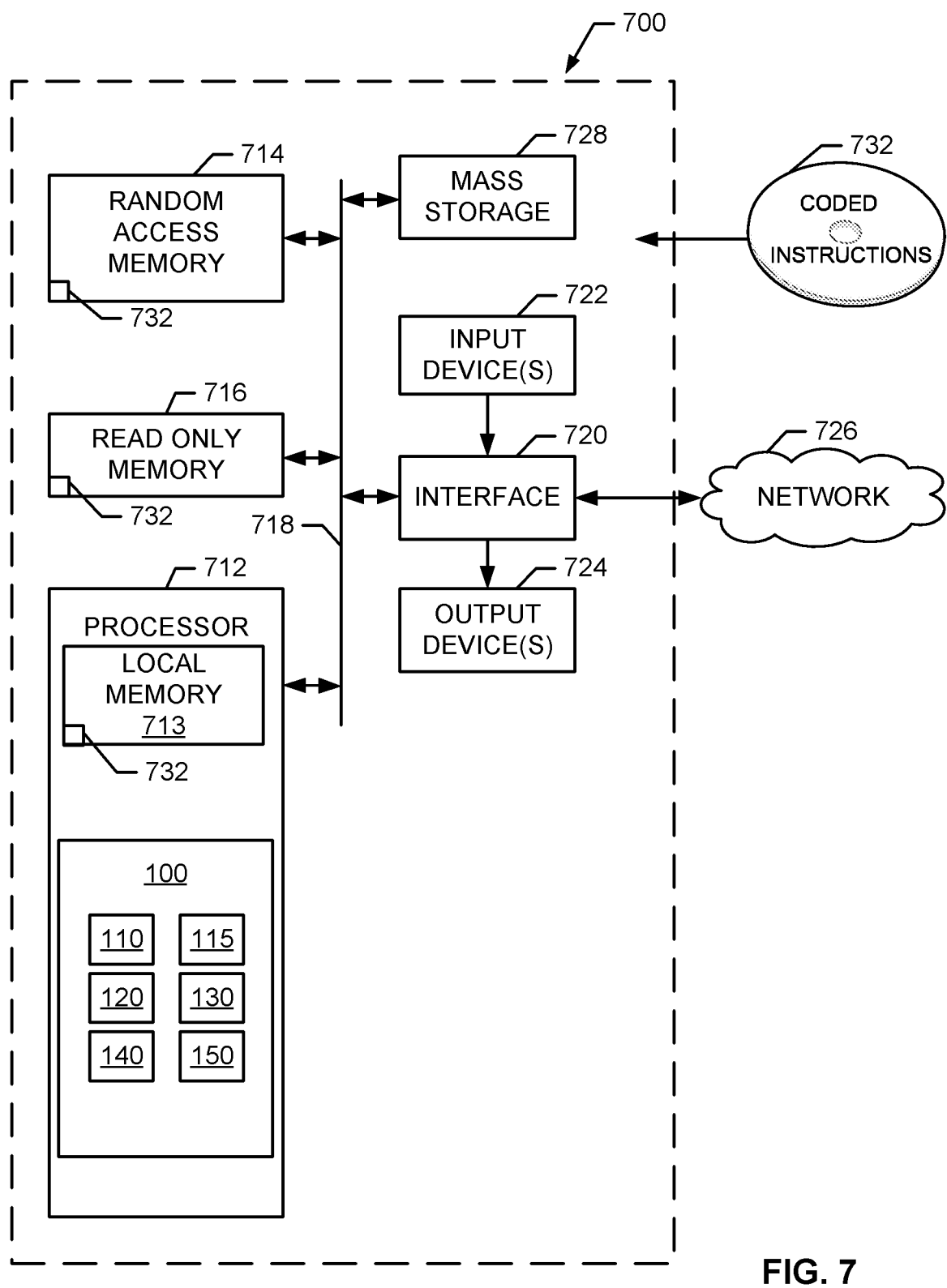
FIG. 7 is a schematic illustration of an example processor platform that can execute the instructions of FIGS. 2-6 to implement the example system of FIG. 1.

FIG. 7 is a block diagram of an example processor platform 700 capable of executing the instructions of FIGS. 2-6 to implement the systems of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example, the processor 712 is structured to include the example shipment coordination system 100 including the example shipping group coordinator 110, the example register 115, the example address generator 120, the example shipment tracker 130, the example change processor 140, the example verification engine 150, etc.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, one or more input devices 722 are connected to the interface circuit 720. The input device(s) 722 permit(s) a user to enter data and commands into the processor 712. The input device(s) 722 can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device). The interface circuit 720 of the illustrated example, thus, typically includes a graphics driver card, a graphics driver chip or a graphics driver processor. Shipping information, delivery instructions, package tracking information, delivery status, receipt confirmation, etc., can be displayed and/or otherwise output via one or more output devices 724, for example.

An output/display device 724 can be used with or as part of the shipping server 160, the delivery acknowledgement device 170, the sending application 180, and/or the receiving application 190 to display information regarding shipping/delivery parameters, status, chain of authorization, PA/DA of sender and/or receiver, receipt confirmation, etc. The display device can be an interactive display device facilitating interaction by providing an output and receiving an input (e.g., a touchscreen and/or keyboard/keypad input, etc.) via the display device, such as the delivery acknowledgement device 170 and/or a computing device executing the sending application 180 and/or the receiving application 190, for example.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 2-6 can be stored in the mass storage device 728, in the volatile memory 714, in the non-volatile memory 716, and/or on a removable tangible computer readable storage medium such as a CD or DVD.

Figure 8:
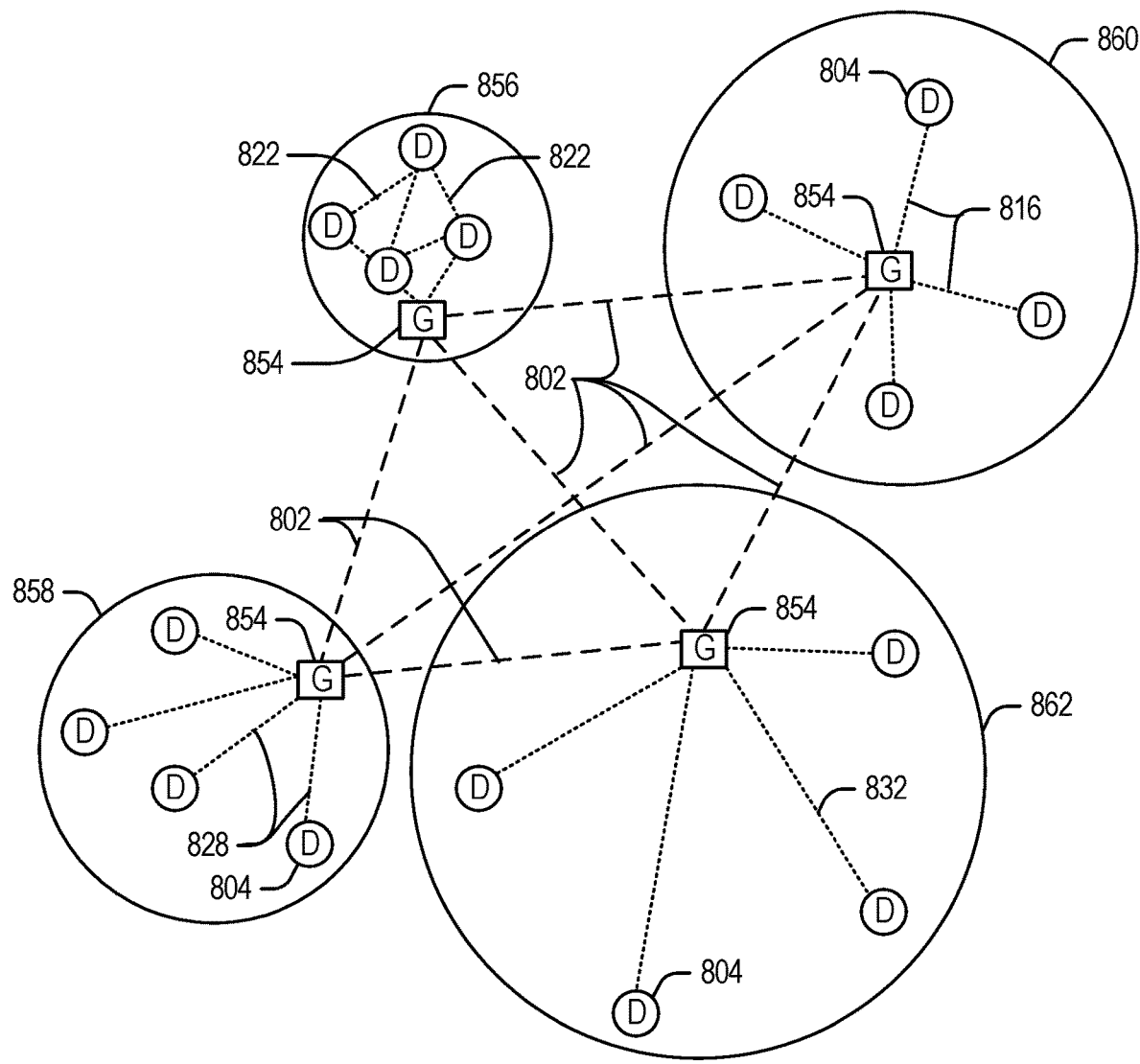
FIG. 8 illustrates an example domain topology for respective internet-of-things (IoT) networks coupled through links to respective gateways.

FIG. 8 illustrates an example domain topology for respective internet-of-things (IoT) networks coupled through links to respective gateways. In certain examples, the IoT involves a large number of computing devices interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. For example, IoT devices can include the delivery acknowledgement device 170, a tag associated with a package to track the shipment in communication with the shipment tracker 130, a device executing the sending application 180, a device executing the receiving application 190, etc. A package delivery involving multiple transfers, for example, can leverage a plurality of IoT devices in an IoT network to track package location, current DA/PA, delegation chain of authorized receiver(s), etc.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced herein, present a number of new challenges in a heterogeneous network of connectivity comprising a combination of wired and wireless technologies. Components, such as the system 100 and other components of FIG. 1, can be implemented as devices in wireless communication, devices wired together and transmitting instructions and data via connecting wires, and/or a combination of wireless and wired connectivity, for example.

FIG. 8 provides a simplified drawing of a domain topology that can be used for a number of IoT networks including IoT devices 804 (e.g., an example of the processor platform 700, etc.), with the IoT networks 856, 858, 860, 862, coupled through backbone links 802 to respective gateways 854. As discussed above with respect to FIG. 7, a package delivery involving multiple transfers, for example, can leverage a plurality of IoT devices 804 in IoT network(s) 856-862 to track package location, determine current DA/PA, verify a delegation chain of authorized receiver(s), etc.

For example, a number of IoT devices 804 can communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks can also be integrated with coordinator devices that provide a chain of links that forms cluster tree of linked devices and networks.

Each of these IoT networks can provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, can be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This can allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks can be further enhanced by the integration of sensing technologies, such as sound, light, electronic traffic, facial and pattern recognition, smell, vibration, into the autonomous organizations among the IoT devices. The integration of sensory systems can allow systematic and autonomous communication and coordination of service delivery against contractual service objectives, orchestration and quality of service (QoS) based swarming and fusion of resources. Some of the individual examples of network-based resource processing include the following.

The mesh network 856, for instance, can be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 858, for instance, can use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 can include systems that perform non-Internet protocol (IP) to IP interconnections, addressing, and routing. Further, each of the IoT devices 804 may include the appropriate transceiver for wide area communications with that device. Further, each IoT device 804 can include other transceivers for communications using additional protocols and frequencies.

Finally, clusters of IoT devices can be equipped to communicate with other IoT devices as well as with a cloud network. This can allow the IoT devices to form an ad-hoc network between the devices, allowing them to function as a single device, which may be termed a fog device. This configuration is discussed further with respect to FIG. 9 below.

Figure 9:
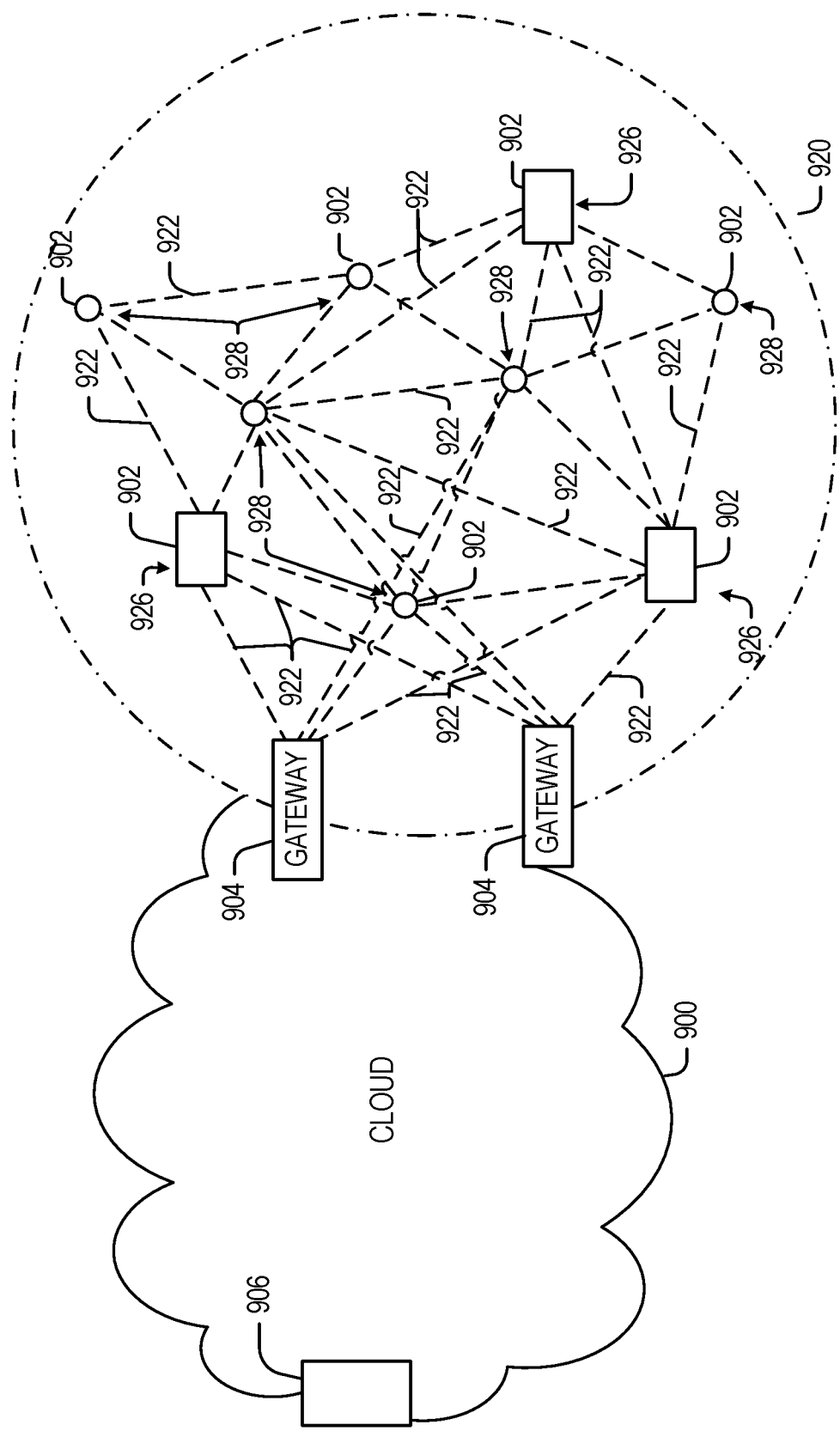
FIG. 9 illustrates a cloud computing network in communication with a mesh network of IoT devices operating as a fog device at the edge of a cloud computing network.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 can be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920 and can also provide the backend process function for data obtained from sensors 928, such as motion data, flow data, temperature data, and the like. The data aggregators 926 can collect data from any number of the sensors 928 and perform the back end processing function for the analysis. The results, raw data, or both can be passed along to the cloud 900 through the gateways 904. The sensors 928 can be full IoT devices 902, for example, capable of both collecting data and processing the data. In some cases, the sensors 928 can be more limited in functionality, for example, collecting the data and allowing the data aggregators 926 or gateways 904 to process the data.

Communications from any IoT device 902 can be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network can allow IoT devices 902 that are very low power or located at a distance from infrastructure to be used, as the range to connect to another IoT device 902 can be much less than the range to connect to the gateways 904.

The fog 920 provided from these IoT devices 902 can be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 can be considered a distributed platform that provides computing and storage resources to perform processing or data-intensive tasks such as data analytics, data aggregation, and machine-learning, among others.

In some examples, the IoT devices 902 can be configured using an imperative programming style, e.g., with each IoT device 902 having a specific function and communication partners. However, the IoT devices 902 forming the fog device can be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 can result in the fog 920 device selecting the IoT devices 902, such as particular sensors 928, needed to answer the query. The data from these sensors 928 can then be aggregated and analyzed by any combination of the sensors 928, data aggregators 926, or gateways 904, before being sent on by the fog 920 device to the server 906 to answer the query. In this example, IoT devices 902 in the fog 920 can select the sensors 928 used based on the query, such as adding data from flow sensors or temperature sensors. Further, if some of the IoT devices 902 are not operational, other IoT devices 902 in the fog 920 device can provide analogous data, if available.

From the foregoing, it will be appreciated that the above disclosed methods, apparatus and articles of manufacture facilitate improved shipment coordination and dynamic modification to enable adjustment of receiver, tracking, and authenticating chain of custody through automated, electronic shipment management.

Certain examples provide improved tracking of a shipment and dynamic verification of a receiver receiving that shipment. Identity and evolution of the receiver can be tracked via the shipment coordination system 100 and its register 115 to provide a ledger or blockchain of receivers maintain a chain of authorization from an actual receiver of the package back to a receiver authorized by the sender to receive the shipment. This delegation-chain can be used to audit, verify, and authorize receiver(s) and track a progression of receivers if shipment breaks down, receipt is not verified, fraudulent receipt is detected, etc. Certain examples provide the delegation-chain to authenticate chain of custody in the delivery process. Thus, each time a receiver delegates receiving and signing authority to another receiver, a link is added to the delegation-chain representing that transfer of control and ownership to the new receiver and informing the group of the transfer and chain of custody/authorization.

Once both sender and receiver (and/or their association applications/devices) are registered, the shipping group coordinator creates a secure group for the shipment. The secure group has a group encryption key and a proof-of-authorized receiver token. The shipping group coordinator facilitates messaging and/or other communication between group members such as sender and receiver, by providing a conduit, channel, or other medium for messaging communication, for example. The shipping group coordinator can facilitate messaging by relaying or exchanging messages and/or by moderating message communication between the sender and receiver using the group encryption key to help ensure privacy of the message content between intended recipient(s) in the group, for example. Thus, receiver, location, status, and/or other updates, delivery instructions, receipt confirmation, etc., can be securely and privately exchanged among members of the group via the shipping group coordinator. The delivery acknowledgement device and/or the receiving application work to provide receipt confirmation associated with delivery of the package to an authorized receiver at the target address based on verification of the token and the digital signature of the receiver, for example.

Example 1 includes shipment coordination apparatus including an address generator to generate a digital address based on a physical address; a verification engine to verify information including the digital address and at least one encryption key associated with the digital address; and a shipping group coordinator to generate a group including a sender and a receiver based on a) a first digital address associated with the sender, b) a second digital address associated with the receiver, and c) at least one encryption key associated with at least one of the first digital address or the second digital address, the shipping group coordinator to initiate delivery instruction and manage receipt confirmation of a package at a second physical address corresponding to the second digital address based on verification of a token identifying the receiver and to provide messaging between the sender and the receiver in the group using a group encryption key to keep messages private in the group.

Example 2 includes Example 1 and further includes a storage to save the first digital address, the second digital address, the at least one encryption key associated with at least one of the first digital address or the second digital address, the token, and the group encryption key in association with at least the receiver.

Example 3 includes Example 1, wherein the at least one encryption key includes a private encryption key, a private signing key, a public encryption key, and a public signing key.

Example 4 includes Example 1, wherein the shipping group coordinator is to communicate with a sending application and a receiving application to register the first digital address and the second digital address.

Example 5 includes Example 1, wherein the second physical address includes a postal address.

Example 6 includes Example 1, wherein the address generator is to apply an encrypted hash of the second physical address to form the second digital address.

Example 7 includes Example 1, wherein the address generator is to generate the second digital address and a plurality of signing keys for a plurality of receivers at the second digital address.

Example 8 includes Example 1, wherein the shipping group coordinator is to facilitate communication of messages in the group to be verified using a nonce word and a digital signature.

Example 9 includes Example 1, further including a shipment tracker to communicate with a low power tag associated with the package.

Example 10 includes Example 1, wherein the shipping group coordinator is to work with a change processor to form a delegation-chain of receivers in which a first receiver is to delegate receiving authority for the package at the second digital address to a second receiver at a third digital address, the delegation-chain to maintain a record of the chain of authorization from the first receiver to the second receiver.

Example 11 includes a tangible computer-readable storage medium comprising computer readable instructions which, when executed, cause at least one processor to implement at least: an address generator to generate a digital address based on a physical address; a verification engine to verify information including the digital address and at least one encryption key associated with the digital address; and a shipping group coordinator to generate a group including a sender and a receiver based on a) a first digital address associated with the sender, b) a second digital address associated with the receiver, and c) at least one encryption key associated with at least one of the first digital address or the second digital address, the shipping group coordinator to initiate delivery instruction and manage receipt confirmation of a package at a second physical address corresponding to the second digital address based on verification of a token identifying the receiver and to provide messaging between the sender and the receiver in the group using a group encryption key to keep messages private in the group.

Example 12 includes Example 11, wherein the instructions, when executed, further cause the at least one processor to implement a storage to save the first digital address, the second digital address, the at least one encryption key associated with at least one of the first digital address or the second digital address, the token, and the group encryption key in association with at least the receiver.

Example 13 includes Example 11, wherein the at least one encryption key includes a private encryption key, a private signing key, a public encryption key, and a public signing key.

Example 14 includes Example 11, wherein the shipping group coordinator is to communicate with a sending application and a receiving application to register the first digital address and the second digital address.

Example 15 includes Example 11, wherein the second physical address includes a postal address.

Example 16 includes Example 11, wherein the address generator is to apply an encrypted hash of the second physical address to form the second digital address.

Example 17 includes Example 11, wherein the address generator is to generate the second digital address and a plurality of signing keys for a plurality of receivers at the second digital address.

Example 18 includes Example 11, wherein the shipping group coordinator is to facilitate communication of messages in the group to be verified using a nonce word and a digital signature.

Example 19 includes Example 11, wherein the instructions, when executed, further cause the at least one processor to implement a shipment tracker to communicate with a low power tag associated with the package.

Example 20 includes Example 11, wherein the shipping group coordinator is to work with a change processor to form a delegation-chain of receivers in which a first receiver is to delegate receiving authority for the package at the second digital address to a second receiver at a third digital address, the delegation-chain to maintain a record of the chain of authorization from the first receiver to the second receiver.

Example 21 includes a computer-implemented method including: generating, by executing an instruction with at least one processor, a first digital address based on a first physical address; generating, by executing an instruction with the at least one processor, a second digital address based on a second physical address; verifying, by executing an instruction with the at least one processor, the second digital address and at least one encryption key associated with the second digital address; generating, by executing an instruction with the at least one processor, a group including a sender and a receiver based on a) the first digital address associated with the sender, b) the second digital address associated with the receiver, and c) the at least one encryption key associated with the second digital address; facilitating, by executing an instruction with the at least one processor, messaging between the sender and the receiver in the group using a group encryption key to keep messages private within the group; and managing, by executing an instruction with the at least one processor, confirmation of receipt of a package at the second physical address based on verification of a token identifying the receiver.

Example 22 includes Example 21, further including storing the first digital address, the second digital address, the at least one encryption key associated with at least one of the first digital address or the second digital address, the token, and the group encryption key in a storage in association with at least the receiver.

Example 23 includes Example 21, wherein the at least one encryption key includes a private encryption key, a private signing key, a public encryption key, and a public signing key.

Example 24 includes Example 21, further including communicating with a sending application and a receiving application to register the first digital address and the second digital address.

Example 25 includes Example 21, wherein the second physical address includes a postal address.

Example 26 includes Example 21, further including applying an encrypted hash of the second physical address to form the second digital address.

Example 27 includes Example 21, further including generating the second digital address and a plurality of signing keys for a plurality of receivers at the second digital address.

Example 28 includes Example 21, further including facilitating communication of messages in the group to be verified using a nonce word and a digital signature.

Example 29 includes Example 21, further including communicating with a low power tag associated with the package to track a location of the package.

Example 30 includes Example 21, further including form a delegation-chain of receivers in which a first receiver is to delegate receiving authority for the package at the second digital address to a second receiver at a third digital address, the delegation-chain to maintain a record of the chain of authorization from the first receiver to the second receiver.

Example 31 includes an apparatus including means for generating a first digital address based on a first physical address; means for generating a second digital address based on a second physical address; means for verifying the second digital address and at least one encryption key associated with the second digital address; means for generating a group including a sender and a receiver based on a) the first digital address associated with the sender, b) the second digital address associated with the receiver, and c) the at least one encryption key associated with the second digital address; means for facilitating messaging between the sender and the receiver in the group using a group encryption key; and means for managing confirmation of receipt of a package at the second physical address based on verification of a token identifying the receiver.

Example 32 includes a system that includes a shipment coordination apparatus to at least: generate a digital address based on a physical address; verify information including the digital address and at least one encryption key associated with the digital address; generate a group including a sender and a receiver based on a) a first digital address associated with the sender, b) a second digital address associated with the receiver, and c) at least one encryption key associated with at least one of the first digital address or the second digital address; initiate delivery instructions and manage receipt confirmation of a package at a second physical address corresponding to the second digital address based on verification of a token identifying the receiver; and facilitate messaging between the sender and the receiver in the group using a group encryption key. The system of Example 32 includes a shipping server to commit digital addresses to a digital ledger to track a chain of authorization for authorized receivers of the shipment; and a delivery acknowledgement device to obtain receipt confirmation for the package at the target delivery location based on the token.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A shipment coordination apparatus comprising:
memory including instructions; and
at least one processor that is to execute the instructions to implement at least:
an address generator that generates a digital address based on a physical address;
a verification engine that verifies information including the digital address and at least one encryption key associated with the digital address; and
a shipping group coordinator that electronically generates a communication group including a sender and a first receiver based on a) a first digital address associated with the sender, b) a second digital address associated with the first receiver, and c) at least one encryption key associated with at least one of the first digital address or the second digital address, the shipping group coordinator to;
generate a token identifying the first receiver;
initiate a delivery instruction for the first receiver and manage receipt confirmation of a package at a delivery address of a second physical address corresponding to the second digital address based on verification of the token;
provide messaging between the sender and the first receiver in the communication group using a group encryption key to keep messages private in the communication group;
adjust, using at least in a part a notification from the first receiver, the delivery address from the second digital address and the corresponding second physical address to a third digital address and a corresponding third physical address of a second receiver;
update the token to form an updated token to identify the second receiver and to invite the second receiver to join the communication group to message and receive the package at the third physical address using the updated token;
commit the second digital address and the third digital address to a blockchain to establish a chain of authorization; and
manage confirmation of receipt of the package at the third physical address based on verification of the updated token identifying the second receiver.

2. The apparatus of claim 1, further including a storage to save the first digital address, the second digital address, the at least one encryption key associated with at least one of the first digital address or the second digital address, the token, and the group encryption key in association with at least the first receiver.

3. The apparatus of claim 1, wherein the at least one encryption key includes a private encryption key, a private signing key, a public encryption key, and a public signing key.

4. The apparatus of claim 1, wherein the shipping group coordinator is to communicate with a sending application and a receiving application to register the first digital address and the second digital address.

5. The apparatus of claim 1, wherein the second physical address includes a postal address.

6. The apparatus of claim 1, wherein the address generator is to apply an encrypted hash of the second physical address to form the second digital address.

7. The apparatus of claim 1, wherein the address generator is to generate the second digital address and a plurality of signing keys for a plurality of receivers at the second digital address.

8. The apparatus of claim 1, wherein the shipping group coordinator is to facilitate communication of messages in the group to be verified using a nonce word and a digital signature.

9. The apparatus of claim 1, further including a shipment tracker to communicate with a low power tag associated with the package.

10. The apparatus of claim 1, wherein the shipping group coordinator is to work with a change processor to form a delegation-chain of receivers in which the first receiver is to delegate receiving authority for the package at the second digital address to the second receiver at the third digital address, the delegation-chain to maintain a record of the chain of authorization from the first receiver to the second receiver.

11. A non-transitory computer-readable storage medium comprising computer readable instructions which, when executed, cause at least one processor to implement at least:
an address generator that generates a digital address based on a physical address;
a verification engine that verifies information including the digital address and at least one encryption key associated with the digital address; and
a shipping group coordinator that electronically generates a communication group including a sender and a first receiver based on a) a first digital address associated with the sender, b) a second digital address associated with the first receiver, and c) at least one encryption key associated with at least one of the first digital address or the second digital address, the shipping group coordinator to:
generate a token identifying the first receiver;
initiate a delivery instruction for the first receiver and manage receipt confirmation of a package at a delivery address of a second physical address corresponding to the second digital address based on verification of the token;
provide messaging between the sender and the first receiver in the communication group using a group encryption key to keep messages private in the communication group;
adjust, using at least in a part a notification from the first receiver, the delivery address from the second digital address and the corresponding second physical address to a third digital address and a corresponding third physical address of a second receiver;
update the token to form an updated token to identify the second receiver and to invite the second receiver to join the communication group to message and receive the package at the third physical address using the updated tokens;
commit the second digital address and the third digital address to a blockchain to establish a chain of authorization; and
manage confirmation of receipt of the package at the third physical address based on verification of the updated token identifying the second receiver.

12. The non-transitory computer-readable storage medium of claim 11, wherein the instructions, when executed, further cause the at least one processor to implement a storage to save the first digital address, the second digital address, the at least one encryption key associated with at least one of the first digital address or the second digital address, the token, and the group encryption key in association with at least the first receiver.

13. The non-transitory computer-readable storage medium of claim 11, wherein the at least one encryption key includes a private encryption key, a private signing key, a public encryption key, and a public signing key.

14. The non-transitory computer-readable storage medium of claim 11, wherein the shipping group coordinator is to communicate with a sending application and a receiving application to register the first digital address and the second digital address.

15. The non-transitory computer-readable storage medium of claim 11, wherein the second physical address includes a postal address.

16. The non-transitory computer-readable storage medium of claim 11, wherein the address generator is to apply an encrypted hash of the second physical address to form the second digital address.

17. The non-transitory computer-readable storage medium of claim 11, wherein the address generator is to generate the second digital address and a plurality of signing keys for a plurality of receivers at the second digital address.

18. The non-transitory computer-readable storage medium of claim 11, wherein the shipping group coordinator is to facilitate communication of messages in the group to be verified using a nonce word and a digital signature.

19. The non-transitory computer-readable storage medium of claim 11, wherein the instructions, when executed, further cause the at least one processor to implement a shipment tracker to communicate with a low power tag associated with the package.

20. The non-transitory computer-readable storage medium of claim 11, wherein the shipping group coordinator is to work with a change processor to form a delegation-chain of receivers in which the first receiver is to delegate receiving authority for the package at the second digital address to the second receiver at the third digital address, the delegation-chain to maintain a record of the chain of authorization from the first receiver to the second receiver.

21. A computer-implemented method comprising:
generating, by executing an instruction with at least one processor, a first digital address based on a first physical address;
generating, by executing an instruction with the at least one processor, a second digital address based on a second physical address;
verifying, by executing an instruction with the at least one processor, the second digital address and at least one encryption key associated with the second digital address; electronically generating, by executing an instruction with the at least one processor, a communication group including a sender and a first receiver based on a) the first digital address associated with the sender, b) the second digital address associated with the first receiver, and c) the at least one encryption key associated with the second digital address;

generating, by executing an instruction with the at least one processor, a token identifying the first receiver;

providing, by executing an instruction with the at least one processor, messaging between the sender and the receiver in the communication group using a group encryption key to keep messages private in the communication group;

adjusting, using at least in part a notification from the first receiver, a delivery address from the second digital address and corresponding second physical address to a third digital address and a corresponding third physical address of a second receiver, the delivery address used to deliver a package;

updating the token associated with the communication group to form an updated token to identify the second receiver;

inviting the second receiver to join the communication group to message and receive the package at the third physical address;

committing the second digital address and the third digital address to a blockchain to establish a chain of authorization; and managing, by executing an instruction with the at least one processor, confirmation of receipt of the package at the third physical address based on verification of the updated token identifying the second receiver.

22. The method of claim 21, further including storing the first digital address, the second digital address, the at least one encryption key associated with at least one of the first digital address or the second digital address, the token, and the group encryption key in a storage in association with at least the first receiver.

23. The method of claim 21, wherein the at least one encryption key includes a private encryption key, a private signing key, a public encryption key, and a public signing key.

24. The method of claim 21, further including communicating with a sending application and a receiving application to register the first digital address and the second digital address.

25. The method of claim 21, wherein the second physical address includes a postal address.

26. The method of claim 21, further including applying an encrypted hash of the second physical address to form the second digital address.

27. The method of claim 21, further including generating the second digital address and a plurality of signing keys for a plurality of receivers at the second digital address.

28. The method of claim 21, further including facilitating communication of messages in the group to be verified using a nonce word and a digital signature.

29. The method of claim 21, further including communicating with a low power tag associated with the package to track a location of the package.

30. The method of claim 21, further including forming a delegation-chain of receivers in which the first receiver is to delegate receiving authority for the package at the second digital address to the second receiver at the third digital address, the delegation-chain to maintain a record of the chain of authorization from the first receiver to the second receiver.

* * * * *